(12) United States Patent
Vassilovski et al.

(10) Patent No.: US 11,736,891 B2
(45) Date of Patent: Aug. 22, 2023

(54) USER EQUIPMENT BASED POSITIONING

(71) Applicant: QUALCOMM Incorporated, San Diego, CA (US)

(72) Inventors: Dan Vassilovski, Del Mar, CA (US); Shuanshuan Wu, San Diego, CA (US); Kapil Gulati, Belle Mead, NJ (US); Hong Cheng, Basking Ridge, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/456,200

(22) Filed: Nov. 23, 2021

(65) Prior Publication Data
US 2023/0164511 A1 May 25, 2023

(51) Int. Cl.
*H04W 4/02* (2018.01)
*H04W 4/40* (2018.01)

(52) U.S. Cl.
CPC ............... *H04W 4/02* (2013.01); *H04W 4/40* (2018.02)

(58) Field of Classification Search
CPC ....... H04W 64/00; H04W 4/40; H04W 92/18; H04W 4/46; H04W 4/44; H04W 4/023; H04W 4/027; H04W 4/02
See application file for complete search history.

(56) References Cited

U.S. PATENT DOCUMENTS

| | | | |
|---|---|---|---|
| 2013/0084884 A1* | 4/2013 | Teyeb | H04W 48/04 455/456.1 |
| 2018/0341264 A1* | 11/2018 | Knych | G05D 1/0246 |
| 2020/0342760 A1* | 10/2020 | Vassilovski | G05D 1/0289 |
| 2022/0386093 A1* | 12/2022 | Baek | H04W 36/0085 |

FOREIGN PATENT DOCUMENTS

| | | | | |
|---|---|---|---|---|
| WO | WO-2017126948 A1 * | 7/2017 | | H04W 24/02 |
| WO | WO-2021240478 A1 * | 12/2021 | | |

* cited by examiner

*Primary Examiner* — Dung Hong
(74) *Attorney, Agent, or Firm* — Harrity & Harrity LLP

(57) ABSTRACT

Various aspects of the present disclosure generally relate to wireless communication. In some aspects, a transmitter user equipment (UE) may transmit, to a receiver UE, a first communication that includes a positioning reference signal (PRS) associated with the transmitter UE. The UE may transmit, to the receiver UE, a second communication that includes an information element associated with a boundary of a vehicle associated with the transmitter UE. Numerous other aspects are described.

30 Claims, 18 Drawing Sheets

```
VehicleType ::= INTEGER (0..65535)
--Passenger Vehicles
    PassengerVehicleType1 ::= 0  --Manufacturer A, Year X, Model C
    PassengerVehicleType2 ::= 1  --Manufacturer B, Year X, Model D
    ⋮
--Light Truck Vehicles
    LightTruckVehicleType1 ::= 30 --Manufacturer C, Year Y, Model Z
    LightTruckVehicleType3 ::= 31 --Manufacturer D, Year X, Model M
}
```

Example of vehicle type

USER EQUIPMENT BASED POSITIONING

FIELD OF THE DISCLOSURE

Aspects of the present disclosure generally relate to wireless communication and to techniques and apparatuses for user equipment based positioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example of an information element associated with a type of a vehicle, in accordance with the present disclosure.

SUMMARY

Figure 1:
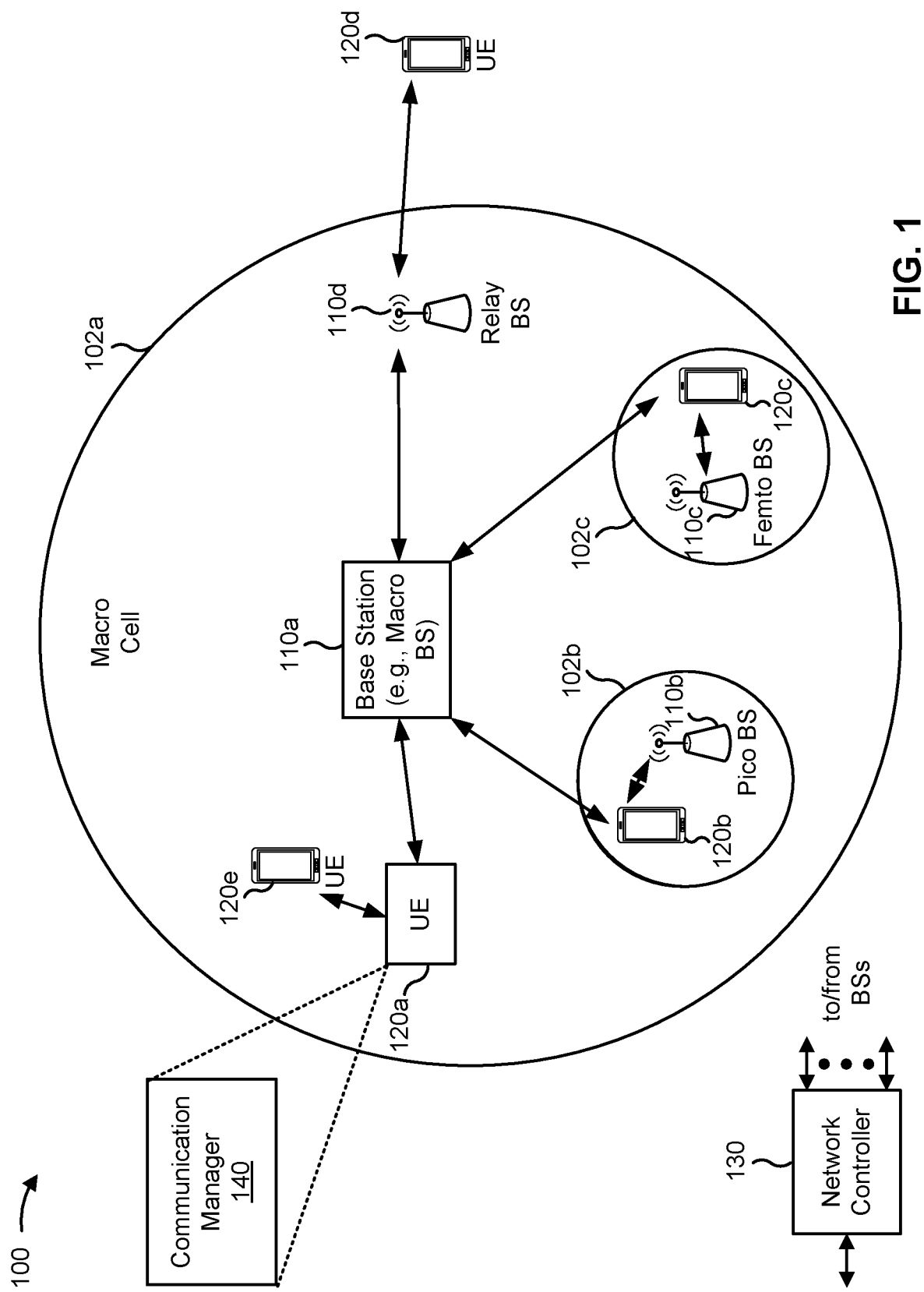
FIG. 1 is a diagram illustrating an example of a wireless network, in accordance with the present disclosure.

Some aspects described herein relate to a method of wireless communication performed by a transmitter user equipment (UE). The method may include transmitting, to a receiver UE, a first communication that includes a positioning reference signal (PRS) associated with the transmitter UE. The method may include transmitting, to the receiver UE, a second communication that includes an information element associated with a boundary of a vehicle associated with the transmitter UE.

Some aspects described herein relate to a method of wireless communication performed by a receiver UE. The method may include receiving, from a transmitter UE, a first communication that includes a PRS associated with the transmitter UE. The method may include receiving, from the transmitter UE, a second communication that includes an information element associated with a boundary of a vehicle associated with the transmitter UE.

Some aspects described herein relate to an apparatus for wireless communication performed by a transmitter UE. The apparatus may include a memory and one or more processors, coupled to the memory. The one or more processors may be configured to transmit, to a receiver UE, a first communication that includes a PRS associated with the transmitter UE. The one or more processors may be configured to transmit, to the receiver UE, a second communication that includes an information element associated with a boundary of a vehicle associated with the transmitter UE.

Some aspects described herein relate to an apparatus for wireless communication performed by a receiver UE. The apparatus may include a memory and one or more processors, coupled to the memory. The one or more processors may be configured to receive, from a transmitter UE, a first communication that includes a PRS associated with the transmitter UE. The one or more processors may be configured to receive, from the transmitter UE, a second communication that includes an information element associated with a boundary of a vehicle associated with the transmitter UE.

Some aspects described herein relate to a non-transitory computer-readable medium that stores a set of instructions for wireless communication by a transmitter UE. The set of instructions, when executed by one or more processors of the UE, may cause the UE to transmit, to a receiver UE, a first communication that includes a PRS associated with the transmitter UE. The set of instructions, when executed by one or more processors of the UE, may cause the UE to transmit, to the receiver UE, a second communication that includes an information element associated with a boundary of a vehicle associated with the transmitter UE.

Some aspects described herein relate to a non-transitory computer-readable medium that stores a set of instructions for wireless communication by a receiver UE. The set of instructions, when executed by one or more processors of the UE, may cause the UE to receive, from a transmitter UE, a first communication that includes a PRS associated with the transmitter UE. The set of instructions, when executed by one or more processors of the UE, may cause the UE to receive, from the transmitter UE, a second communication that includes an information element associated with a boundary of a vehicle associated with the transmitter UE.

Some aspects described herein relate to an apparatus for wireless communication. The apparatus may include means for transmitting, to a receiver UE, a first communication that includes a PRS associated with the apparatus. The apparatus may include means for transmitting, to the receiver UE, a second communication that includes an information element associated with a boundary of a vehicle associated with the apparatus.

Some aspects described herein relate to an apparatus for wireless communication. The apparatus may include means for receiving, from a transmitter UE, a first communication that includes a PRS associated with the transmitter UE. The apparatus may include means for receiving, from the transmitter UE, a second communication that includes an information element associated with a boundary of a vehicle associated with the transmitter UE.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support an RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the transmitter UE 120 may include a communication manager 140. As described in more detail elsewhere herein, the communication manager 140 may transmit, to a receiver UE, a first communication that includes a positioning reference signal (PRS) associated with the transmitter UE; and transmit, to the receiver UE, a second communication that includes an information element associated with a boundary of a vehicle associated with the transmitter UE. Additionally, or alternatively, the communication manager 140 may perform one or more other operations described herein.

In some aspects, the receiver UE 120 may include a communication manager 140. As described in more detail elsewhere herein, the communication manager 140 may receive, from a transmitter UE, a first communication that includes a PRS associated with the transmitter UE; and receive, from the transmitter UE, a second communication that includes an information element associated with a boundary of a vehicle associated with the transmitter UE. Additionally, or alternatively, the communication manager 140 may perform one or more other operations described herein.

As indicated above, FIG. 1 is provided as an example. Other examples may differ from what is described with regard to FIG. 1.

Figure 2:
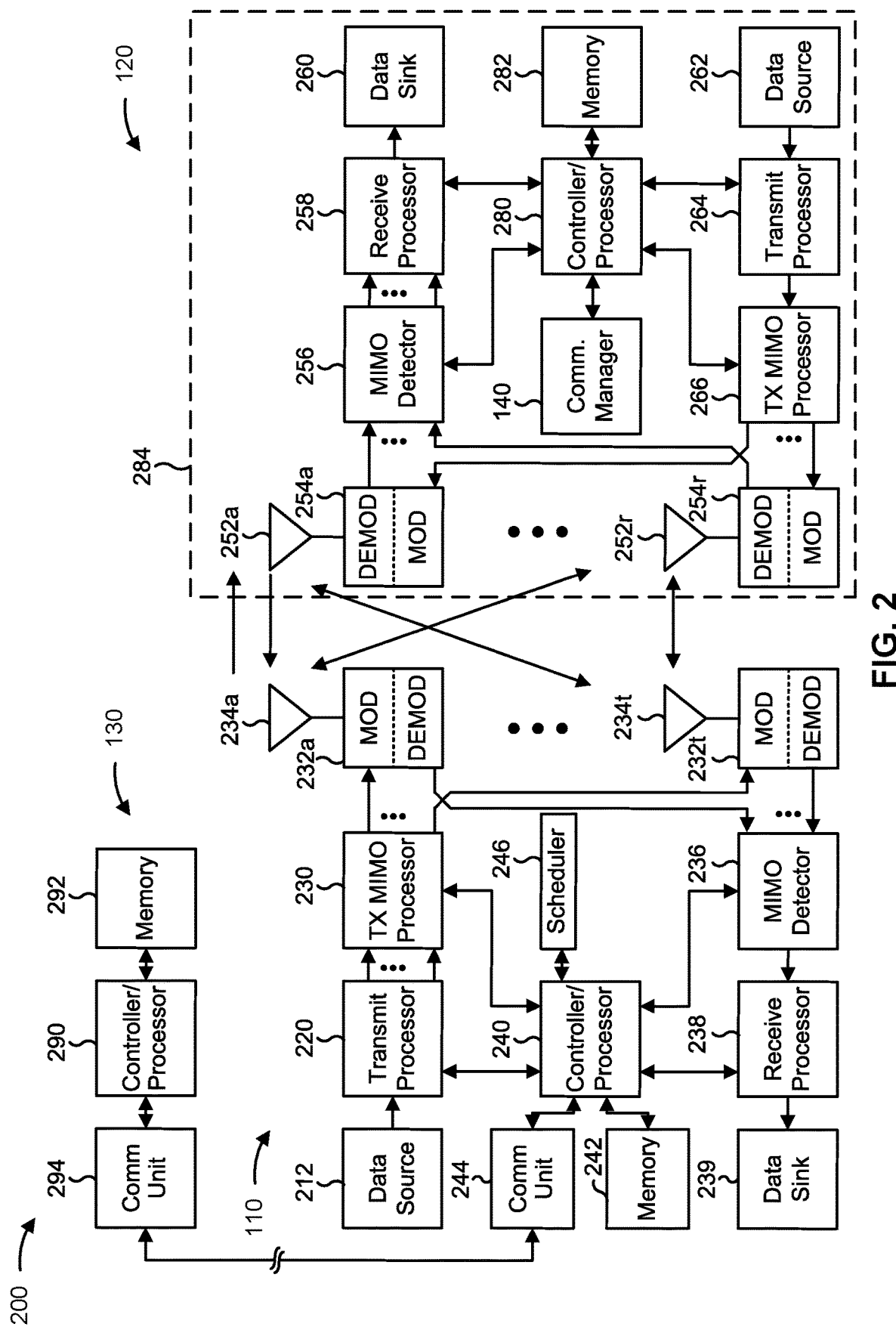
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-16).

The controller/processor 240 of the base station 110, the controller/processor 280 of the UE 120, and/or any other component(s) of FIG. 2 may perform one or more techniques associated with UE based positioning, as described in more detail elsewhere herein. For example, the controller/processor 240 of the base station 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a transmitter UE includes means for transmitting, to a receiver UE, a first communication that includes a PRS associated with the transmitter UE; and/or means for transmitting, to the receiver UE, a second communication that includes an information element associated with a boundary of a vehicle associated with the transmitter UE. The means for the transmitter UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a receiver UE includes means for receiving, from a transmitter UE, a first communication that includes a PRS associated with the transmitter UE; and/or means for receiving, from the transmitter UE, a second communication that includes an information element associated with a boundary of a vehicle associated with the transmitter UE. The means for the receiver UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
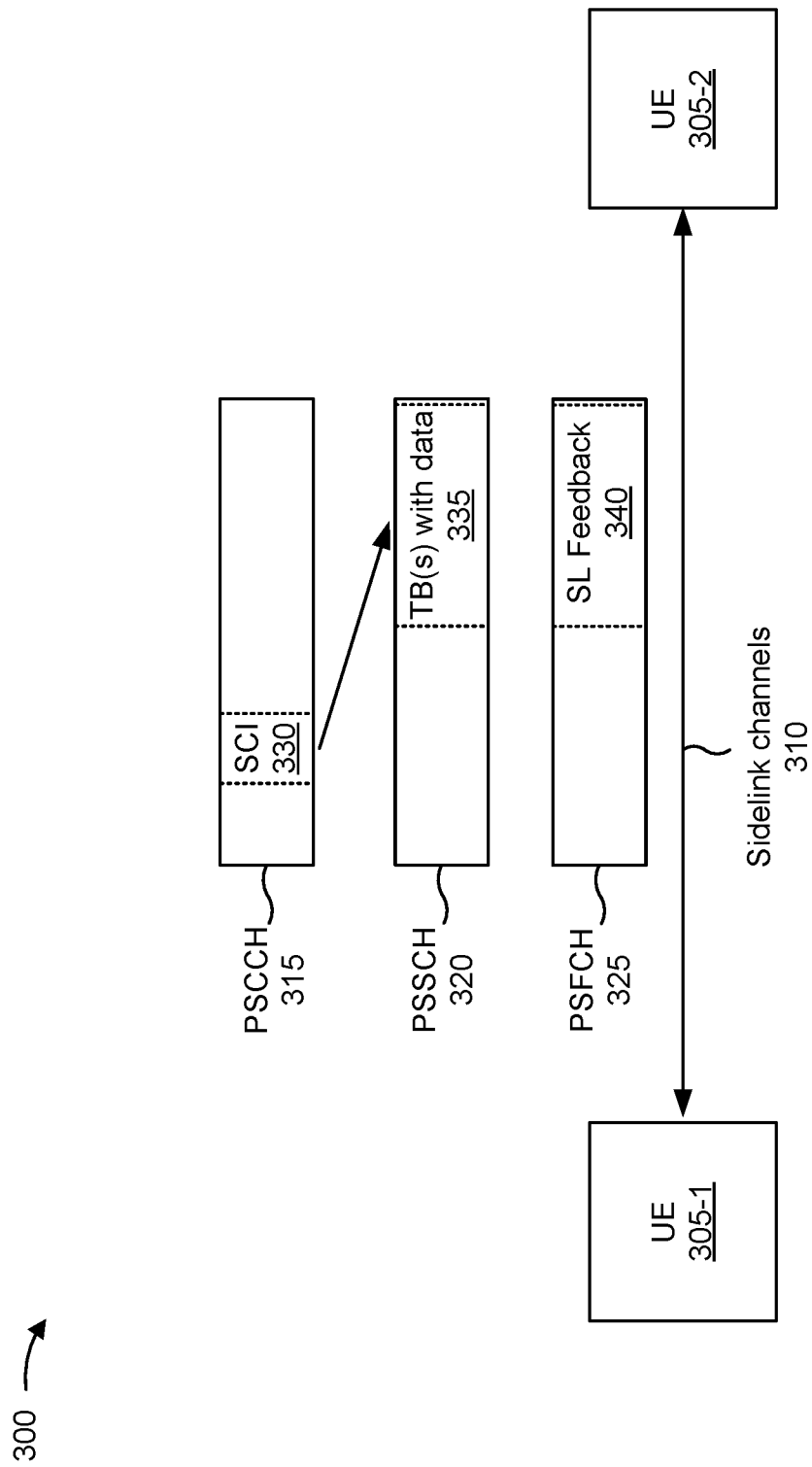
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described in detail herein, the first UE 305-1 may communicate with the second UE 305-2, using the sidelink channels 310, to determine a location of the second UE 305-2. The communication may include a PRS and/or an information element that identifies a boundary of a vehicle associated with the second UE 305-2, to reduce the likelihood of a collision between the first UE 305-1 and the second UE 305-2.

As indicated above, FIG. 3 is provided as an example. Other examples may differ from what is described with respect to FIG. 3.

Figure 4:
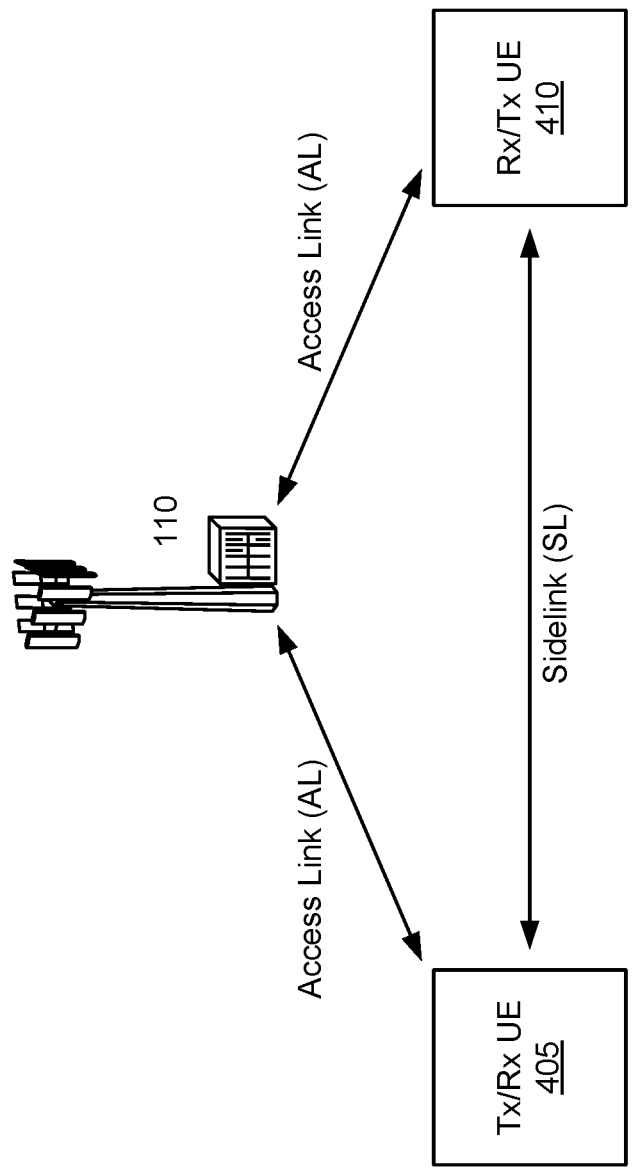
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described in detail herein, the first UE 405 may communicate with the second UE 410, using one or more sidelink communications, to determine a location of the second UE 410. The communication may include a PRS and/or an information element that identifies a boundary of a vehicle associated with the second UE 410, to reduce the likelihood of a collision between the first UE 405 and the second UE 410.

As indicated above, FIG. 4 is provided as an example. Other examples may differ from what is described with respect to FIG. 4.

Figure 5:
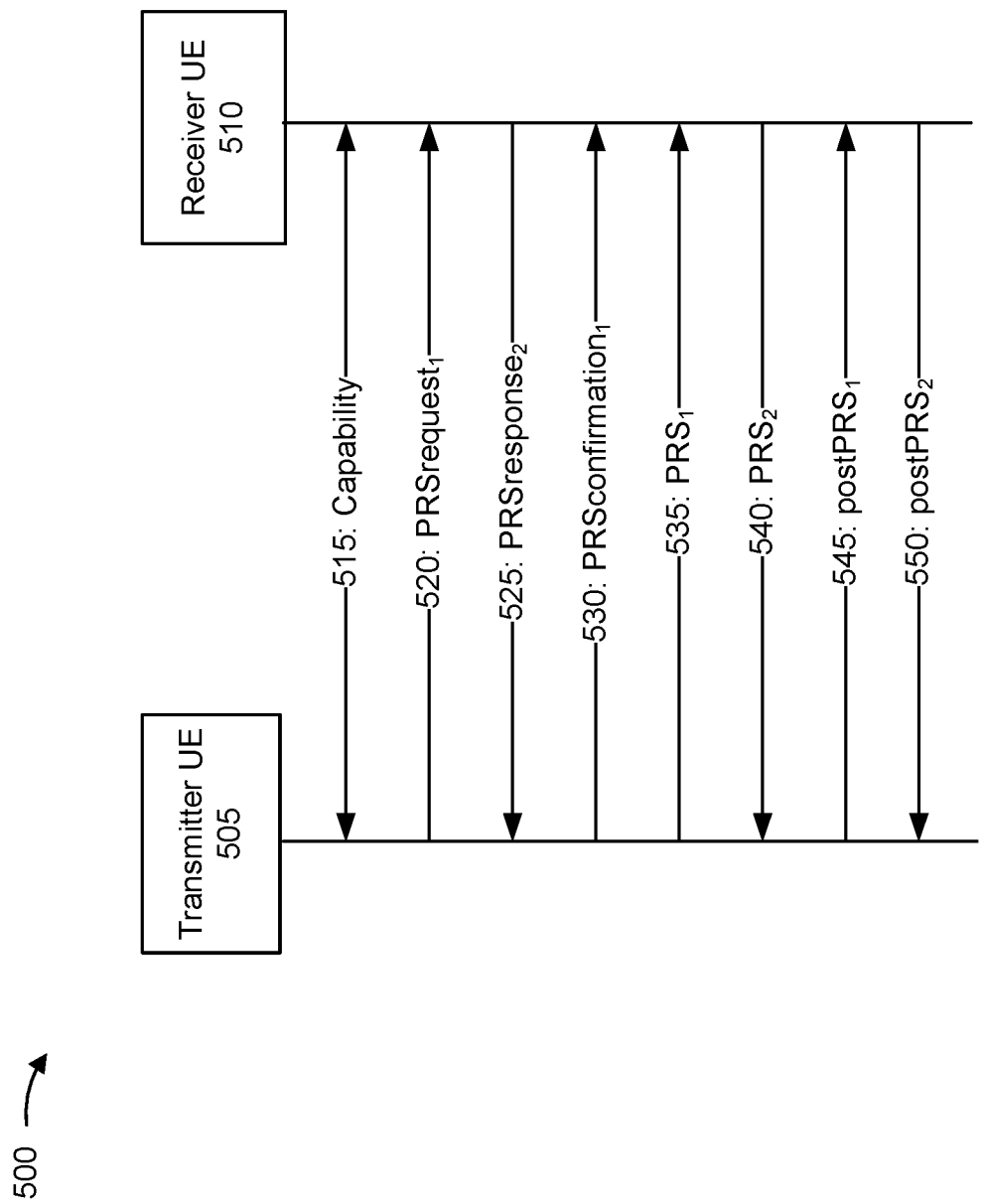
FIG. 5 is a diagram illustrating an example of position reference signaling, in accordance with the present disclosure.

FIG. 5 is a diagram illustrating an example 500 of position reference signaling, in accordance with the present disclosure. A UE, such as the transmitter UE 505, may communicate with another UE, such as the receiver UE 510. In some cases, the transmitter UE 505 and the receiver UE 510 may include some or all of the features of the UE 120. For example, the transmitter UE 505 and the receiver UE 510 may communicate using one or more sidelink communications (e.g., via the PC5 interface). In some cases, the transmitter UE 505 or the receiver UE 510 may be a network node, and may include some or all of the features of the UE 120 and/or the base station 110. For example, the transmitter UE 505 and the receiver UE 510 may communicate using one or more radio link communications (e.g., via the Uu interface). While the UEs 505 and 510 are referred to herein as a transmitter UE and a receiver UE, respectively, each of the transmitter UE 505 and the receiver UE 510 may be configured to both transmit and receive information.

As shown in connection with reference number 515, the transmitter UE 505 and the receiver UE 510 may communicate (e.g., exchange) capability information. For example, the transmitter UE 505 may transmit, and the receiver UE 510 may receive, capability information associated with the transmitter UE 505. Additionally, or alternatively, the receiver UE 510 may transmit, and the transmitter UE 505 may receive, capability information associated with the receiver UE 510. In some cases, the capability information may indicate time and/or frequency information for communications between the transmitter UE 505 and the receiver UE 510. For example, the capability information may indicate a time at which the transmitter UE 505 and the receiver UE 510 may transmit or receive information, and/or which frequency (or frequencies) the transmitter UE 505 and the receiver UE 510 may use for transmitting or receiving the information.

As shown in connection with reference number 520, the transmitter UE 505 may transmit, and the receiver UE 510 may receive, a PRS request message. The PRS request message may indicate that the transmitter UE 505 wants to exchange location information with the receiver UE 510.

As shown in connection with reference number 525, the receiver UE 510 may transmit, and the transmitter UE 505 may receive, a PRS response message. The PRS response message may indicate that the receiver UE 510 has determined to accept the request to exchange location information, or has determined not to accept the request to exchange location information.

As shown in connection with reference number 530, the transmitter UE 505 may transmit, and the receiver UE 510 may receive, a PRS confirmation message. The PRS confirmation message may confirm that the transmitter UE 505 and the receiver UE 510 will exchange location information. The PRS confirmation message may be sent in response to the PRS response message indicating that the receiver UE 510 has accepted the request to exchange location information.

As shown in connection with reference number 535, the transmitter UE 505 may transmit, and the receiver UE 510 may receive, a first PRS message. In some cases, the first PRS message may indicate a location of the transmitter UE 505. In some cases, the first PRS message may not include a location of the transmitter UE 505.

As shown in connection with reference number 540, the receiver UE 510 may transmit, and the transmitter UE 505 may receive, a second PRS message. The receiver UE 510 may transmit the second PRS message in response to receiving the first PRS message. In some cases, the second PRS message may include a location of the receiver UE 510. In some cases, the second PRS message may not include a location of the receiver UE 510.

In some cases, the transmitter UE 505 may determine a distance, or a location, of the receiver UE 510 based at least in part on a round trip time (RTT) of the communication. For example, the transmitter UE 505 may determine the time between transmitting the first PRS message, and receiving the second PRS message, and may determine a distance of the receiver UE 510 from the transmitter UE 505 based at least in part on the RTT. In some cases, if the transmitter UE 505 is not configured with location information for the transmitter UE 505, or is configured with inaccurate location information for the transmitter UE 505, the transmitter UE 505 may be able to determine an inter-UE range (e.g., distance) between the transmitter UE 505 and the receiver UE 510 using the RTT. In some cases, if the transmitter UE 505 is configured with location information for the transmitter UE 505, the transmitter UE 505 may determine an absolute position of the transmitter UE 505 using the RTT.

As shown in connection with reference number 545, the transmitter UE 505 may transmit, and the receiver UE 510 may receive, a first post-PRS message. The first post-PRS message may indicate new location information for the transmitter UE 505, or may indicate an update to the location of the transmitter UE 505.

As shown in connection with reference number 550, the receiver UE 510 may transmit, and the transmitter UE 505 may receive, a second post-PRS message. The second post-PRS message may indicate new location information for the receiver UE 510, or may indicate an update to the location of the receiver UE 510. The transmitter UE 505 may be configured to determine an updated location of the receiver UE 510, and/or an updated distance between the transmitter UE 505 and the receiver UE 510, using the RTT associated with the first post-PRS message and the second post-PRS message.

In some cases, the receiver UE 510 may be configured determine a location of the transmitter UE 505 using the same procedures as those described above. Additionally, or alternatively, the transmitter UE 505 may be configured to communicate with multiple receiver UEs 510, using one or more of the procedures described above, to determine the locations of the receiver UEs 510, and the receiver UE 510 may be configured to communicate with multiple transmitter UEs 505, using one or more of the procedures described above, to determine the locations of the transmitter UEs 505.

As described above, the transmitter UE 505 and the receiver UE 510 may use PRS signaling to determine a distance between the transmitter UE 505 and the receiver UE 510, and/or to determine the locations of the transmitter UE 505 and the receiver UE 510. For example, if the transmitter UE 505 and the receiver UE 510 are not configured with information that identifies the locations of the transmitter UE 505 and the receiver UE 510, respectively, the PRS signaling may enable the transmitter UE 505 and the receiver UE 510 to determine a distance between the two devices. Additionally, or alternatively, if the transmitter UE 505, or the receiver UE 510, is configured with information that identifies the location of the receiver UE 510, or the transmitter UE 505, the PRS signaling may enable the transmitter UE 505, or the receiver UE 510, to determine the exact location of the receiver UE 510, or the transmitter UE 505.

In some cases, the PRS information may not be sufficient for determining device boundaries. In the example of vehicle-to-vehicle (V2V) communications, or vehicle-to-everything (V2X) communications, the transmitter UE (associated with a first vehicle) may be able to determine a location of the receiver UE (associated with a second vehicle), and the receiver UE may be able to determine a location of the transmitter UE. For example, the transmitter UE may be a first antenna, or may be a first device that includes one or more antennas, that is small in size relative to the remainder of the first vehicle. Similarly, the receiver UE may be a second antenna, or may be a second device that includes one or more antennas, that is small in size relative to the remainder of the second vehicle.

In some cases, the PRS signaling may enable the transmitter UE (e.g., the first antenna) to determine the location of the receiver UE (e.g., the second antenna), and may enable the receiver UE to determine the location of the transmitter UE. However, the PRS signaling may not enable the transmitter UE to determine a boundary of the second vehicle associated with the receiver UE, and/or may not enable the receiver UE to determine a boundary of the first vehicle associated with the transmitter UE. For example, the PRS signaling may not enable the transmitter UE or the receiver UE to determine a bumper-to-bumper distance between the first vehicle and the second vehicle. This may be particularly difficult when the vehicle antennas (e.g., antennas used for vehicle positioning) are not located at the vehicle perimeters. Since the transmitter UE and the receiver UE may be small in size relative to the first vehicle and the second vehicle, respectively, a collision between the first vehicle and the second vehicle is more likely without knowledge of the boundary information associated with those vehicles.

Techniques and apparatuses are described herein for UE based positioning. In some aspects, a transmitter UE may transmit a first communication to a receiver UE that includes a PRS associated with the transmitter UE. The transmitter UE may transmit a second communication to the receiver UE that includes an information element associated with a boundary of a vehicle associated with the transmitter UE. In some aspects, the information element may indicate at least one of a reference position of the vehicle, a location of an antenna of the transmitter UE, a size of the vehicle, an attitude of the vehicle, or a type of the vehicle.

As described above, the PRS received from the transmitter UE may enable the receiver UE to determine the location of the transmitter UE. However, in the V2V/V2X example, the transmitter UE may be small in size relative to the remainder of the first vehicle. The information element may enable the receiver UE to determine a boundary of the vehicle associated with the transmitter UE. Additionally, or alternatively, the information element, or another information element, may enable the transmitter UE to determine a boundary of the second vehicle associated with the receiver UE. Therefore, the likelihood of a collision between the first vehicle associated with the transmitter UE, and the second vehicle associated with the receiver UE, is reduced.

The signaling described in connection with FIG. 5 is provided as an example only. The PRS message may be any message that can be used to identify or determine a location of a device, for example, using an RTT calculation. Other signaling messages may be used in place of, or in addition to, the first PRS request message, the second PRS request message, the PRS confirmation message, the first PRS message, the second PRS message, the first post-PRS message, and/or the second post-PRS message.

As indicated above, FIG. 5 is provided as an example. Other examples may differ from what is described with respect to FIG. 5.

Figure 6:
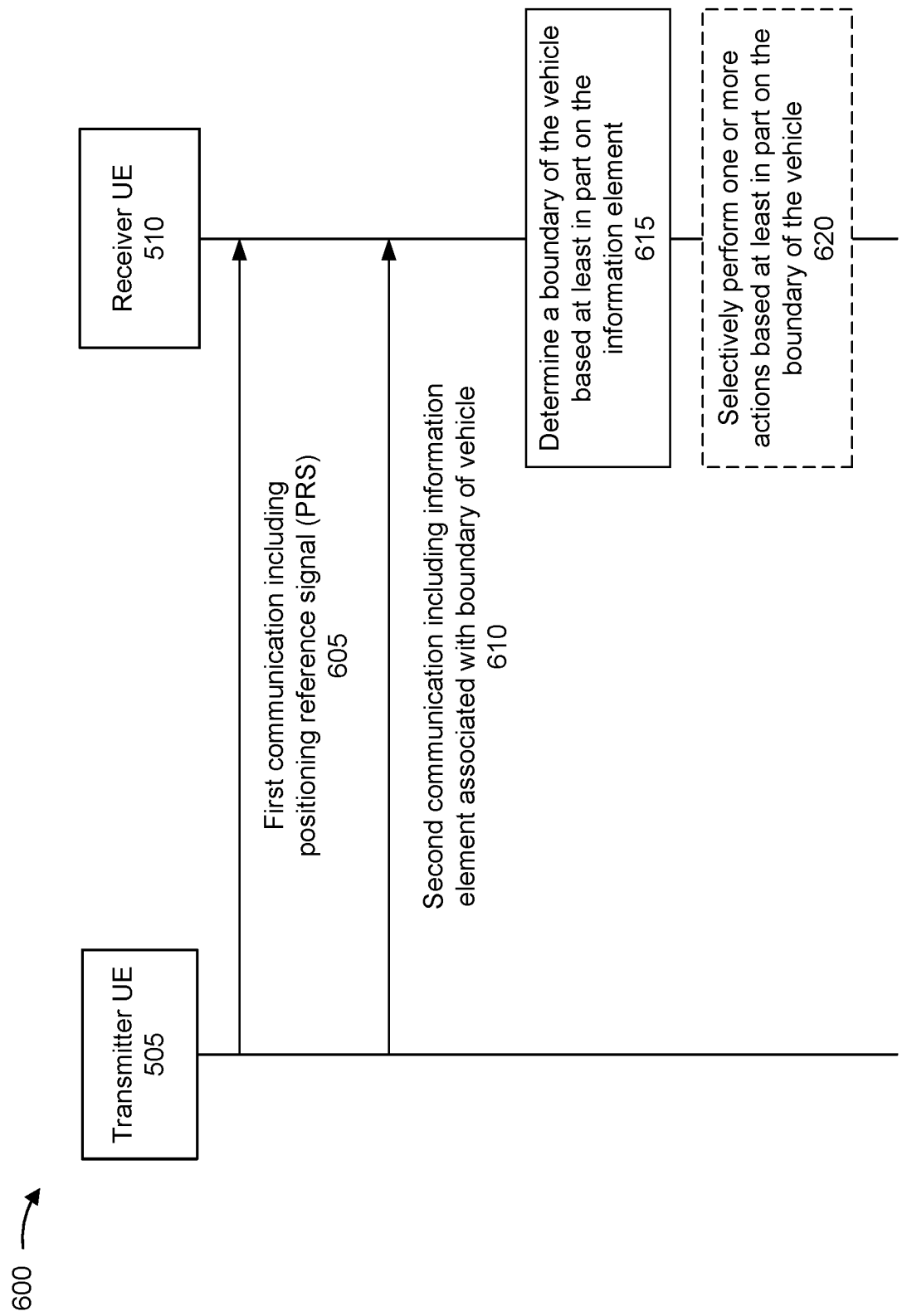
FIG. 6 is a diagram illustrating an example of UE based positioning, in accordance with the present disclosure.

FIG. 6 is a diagram illustrating an example 600 of UE based positioning, in accordance with the present disclosure. As shown, a UE, such as the transmitter UE 505, may communicate with another UE, such as the receiver UE 510. While the UEs 505 and 510 are referred to as the transmitter UE and the receiver UE, respectively, each of the transmitter UE 505 and the receiver UE 510 may be configured to both transmit and receive information.

In some aspects, the transmitter UE 505 may be a first antenna, or may be a first device that includes one or more antennas, associated with a first vehicle. In some aspects, the receiver UE 510 may be a second antenna, or may be a second device that includes one or more antennas, associated with a second vehicle. In some aspects, the transmitter UE 505 and/or the receiver UE 510 may be another device, such as an RSU or a base station. In some aspects, the transmitter UE 505 and the receiver UE 510 may communicate using one or more sidelink communications, such as communications using the PC5 interface. For example, the communications between the transmitter UE 505 and the receiver UE 510 may be V2V communications, or V2X communications, among other examples. In some aspects, the transmitter UE 505 and the receiver UE 510 may communicate using other types of communications, such as radio link communications, or other communications using the Uu interface, among other examples.

As shown in connection with reference number 605, the transmitter UE 505 may transmit, and the receiver UE 510 may receive, a first communication that includes a PRS. In some aspects, the PRS may be any communication (e.g., a wideband signal) that can be used to identify or determine a location of a device (e.g., using an RTT calculation). In some aspects, the PRS may include an indication of a location of the transmitting device (e.g., the transmitter UE 505).

As shown in connection with reference number 610, the transmitter UE 505 may transmit, and the receiver UE 510 may receive, a second communication that includes an information element associated with a boundary of a vehicle. For example, the second communication may include one or more information elements associated with a boundary of the first vehicle associated with the transmitter UE 505. In some aspects, the second communication that includes the information element is an application layer message. In some aspects, the second communication that includes the information element is a PC5 message, such as a PC5 radio resource control (RRC) message.

In some aspects, the information element may be transmitted prior to the PRS message, contemporaneously with the PRS message, or after the PRS message. For example, the information element may be transmitted prior to, contemporaneously with, or after, any of the first PRS request message, the second PRS request message, the PRS confirmation message, the first PRS message, the second PRS message, the first post-PRS message, or the second post-PRS message, described above. In some aspects, the information element may be transmitted irrespective of any PRS signaling. For example, the transmitter UE 505 and the receiver UE 510 may transmit or receive information elements without any PRS signaling occurring between the transmitter UE 505 and the receiver UE 510, or regardless of any PRS signaling between the transmitter UE 505 and the receiver UE 510.

In some aspects, the information element may indicate a reference position of the vehicle (e.g., the first vehicle). The reference position of the vehicle may be indicated by one or more coordinates. The one or more coordinates may be identified relative to the boundary of the vehicle. Additional details regarding the reference position of the vehicle are described in connection with FIGS. 7A and 7B.

In some aspects, the information element may indicate a location of an antenna of the transmitter UE 505. The location of the antenna of the transmitter UE 505 may be indicated relative to the reference position of the vehicle. In some aspects, the transmitter UE 505 may include a plurality of antennas, and the respective locations of each of the plurality of the antennas may be indicated relative to the reference position of the vehicle. Additional details regarding the location of the antenna(s) are described in connection with FIG. 8.

In some aspects, the information element may indicate a size of the vehicle. The size of the vehicle may be indicated as one or more dimensions of the vehicle. In some aspects, the one or more dimensions of the vehicle may include a length of the vehicle, a width of the vehicle, or a height of the vehicle. Additional details regarding the size of the vehicle are described in connection with FIG. 9.

In some aspects, the information element may indicate an attitude of the vehicle. The attitude of the vehicle may be indicated as one or more of a yaw of the vehicle, a pitch of the vehicle, or a roll of the vehicle. Additional details regarding the attitude of the vehicle are described in connection with FIGS. 10A and 10B.

In some aspects, the information element may indicate a type of the vehicle. The type of the vehicle may include a class of the vehicle. Additional details regarding the type of the vehicle are described in connection with FIG. 11.

Although the information elements are described herein as including a reference position of the vehicle, a location of an antenna of the vehicle, a size of the vehicle, an attitude of the vehicle, or a type of the vehicle, the information elements may include other information, including any information that enables a UE to determine a boundary of the vehicle (or any other device).

As shown in connection with reference number 615, the receiver UE 510 may determine a boundary of the vehicle based at least in part on the information element. In some aspects, the receiver UE 510 may determine the boundary of the first vehicle based at least in part on the information element (e.g., without using the PRS). In some aspects, the receiver UE 510 may determine the boundary of the first vehicle based at least in part on the PRS and the information element. For example, the receiver UE 510 may determine the boundary of the first vehicle based at least in part on the reference position of the vehicle, the location of the antenna, the size of the vehicle, the attitude of the vehicle, or the type of the vehicle (as described in more detail in FIGS. 7-12). In some aspects, determining the boundary of the first vehicle may include determining a perimeter of the vehicle.

As shown in connection with reference number 620, the receiver UE 510 may selectively perform one or more actions based at least in part on the boundary of the vehicle.

In some aspects, the receiver UE 510 may be associated with a second vehicle. The receiver UE 510 may be configured with information associated with the boundary of the second vehicle. For example, the receiver UE 510 may be configured with the location of one or more antennas of the second vehicle, the size of the second vehicle, the attitude of the second vehicle, or the type of the second vehicle. The receiver UE 510 may be configured to determine whether or not the second vehicle associated with the receiver UE 510 should perform one or more actions (e.g., movements) based at least in part on the boundaries of the first vehicle and the second vehicle. For example, the receiver UE 510 may determine that the boundary of the second vehicle will not collide with the boundary of the first vehicle if the second vehicle makes a certain movement, and may transmit an instruction for the second vehicle to perform the movement. In contrast, the receiver UE 510 may determine that the boundary of the second vehicle will collide, or may possibly collide, with the boundary of the first vehicle if the second vehicle makes a certain movement, and may not transmit the instruction for the second vehicle to perform the movement, or may transmit an instruction for the second vehicle not to perform the movement.

In some aspects, the receiver UE 510 may be associated with another device, such as an RSU, and the transmitter UE 505 may perform sidelink positioning to determine the location of the transmitter UE 505. Additional details of this feature are described in connection with FIG. 12.

As described above, the PRS received from the transmitter UE 505 may enable the receiver UE 510 to determine the location of the transmitter UE 505. However, in the V2V/V2X example, the transmitter UE 505 may be small in size relative to the remainder of the first vehicle. The information element may enable the receiver UE 510 to determine a boundary of the vehicle associated with the transmitter UE 505. Additionally, or alternatively, the information element, or another information element, may enable the transmitter UE 505 to determine a boundary of the second vehicle associated with the receiver UE 510. Therefore, the likelihood of a collision between the first vehicle associated with the transmitter UE 505, and the second vehicle associated with the receiver UE 510, is reduced.

Although the examples in this figure, and throughout this disclosure, are described in the context of V2V/V2X communications, the information elements may be used in numerous other examples and scenarios. For example, the information element signaling may be implemented in any scenario that uses PRS signaling Additionally, or alternatively, the information element signaling may be implemented in any scenario for determining a boundary of a device.

As indicated above, FIG. 6 is provided as an example. Other examples may differ from what is described with respect to FIG. 6.

Figure 7A:
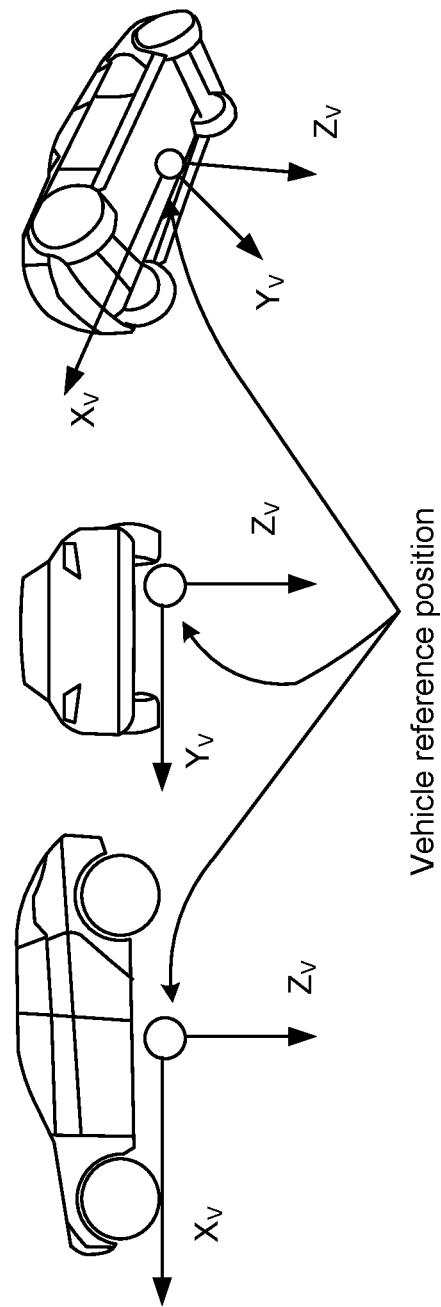
FIGS. 7A and 7B are diagrams illustrating an example of an information element associated with a reference position, in accordance with the present disclosure.
Figure 7B:
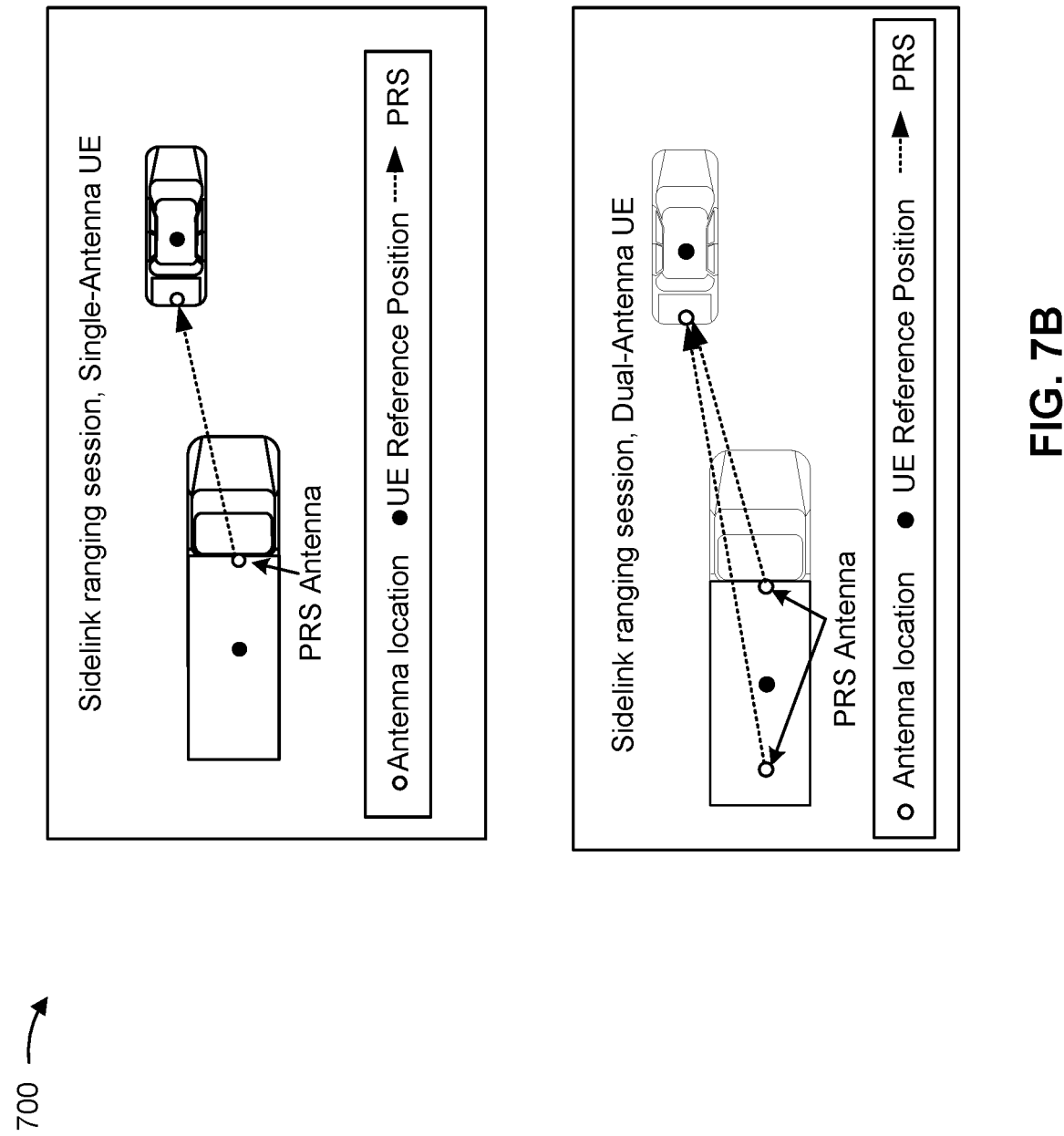

FIGS. 7A and 7B are diagrams illustrating an example 700 of an information element associated with a reference position, in accordance with the present disclosure. In some aspects, the information element may indicate a reference position of the vehicle. The reference position may be indicated by one or more coordinates (e.g., as shown in FIG. 7A). For example, an X coordinate may correspond to a length of the vehicle, a Y coordinate may correspond to a width of the vehicle, and a Z coordinate may correspond to a height of the vehicle. In some aspects, the reference position may enable the specification of an antenna location relative to the vehicle boundary (e.g., as shown in FIG. 7B).

In some aspects, the boundary of the vehicle may be identified relative to the one or more coordinates. For example, a first boundary of the vehicle may be identified in the X coordinate relative to the reference position, a second boundary of the vehicle may be identified in the Y coordinate relative to the reference position, and a third boundary of the vehicle may be identified in the Z coordinate relative to the reference position. The first boundary, the second boundary, and/or the third boundary may be the same boundaries, or may be different boundaries.

In some aspects, sidelink ranging or positioning may use a convention associated with the society of automotive engineers (SAE), with the reference position being defined by the center of a rectangle projected onto the ground plane, and bounded by the furthest lateral and longitudinal extent of the vehicle. The vehicle body axes (Xv, Yv, Zv) may follow the right-hand rule, with the Xv-axis in the vehicle forward direction.

As indicated above, FIGS. 7A and 7B are provided as examples. Other examples may differ from what is described with respect to FIGS. 7A and 7B.

Figure 8:
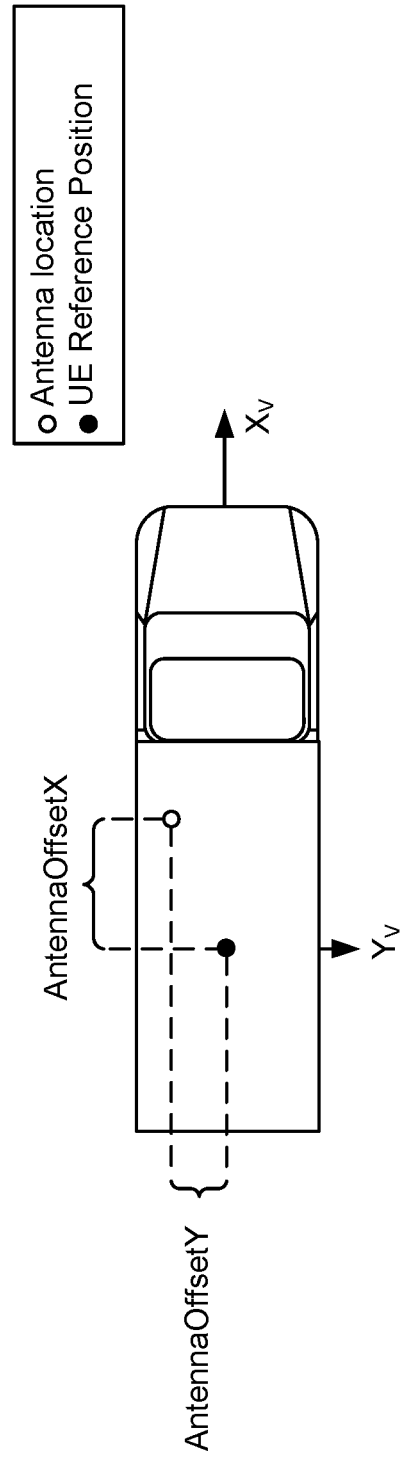
FIG. 8 is a diagram illustrating an example of an information element associated with a location of one or more antennas, in accordance with the present disclosure.

FIG. 8 is a diagram illustrating an example 800 of an information element associated with a location of one or more antennas, in accordance with the present disclosure. In some aspects, the information element may indicate a location of an antenna. As described above, the transmitter UE 505 may be an antenna, or may be a device that includes one or more antennas. The location of the antenna may be indicated relative to the reference position of the vehicle. For example, the location of the antenna may be indicated in the X coordinate relative to the reference position, in the Y coordinate relative to the reference position, and/or in the Z coordinate relative to the reference position. In some aspects, as described above, the vehicle may include a plurality of antennas, and the respective locations of each of the plurality of the antennas may be indicated relative to the reference position of the vehicle.

In some aspects, the specification of the antenna location may enable an accurate interpretation of position measurement. For example, the antenna location may be defined as a Cartesian offset from the vehicle reference position, based on the vehicle inherent body axes (Xv, Yv, Zv). In one example, a distance of 327 meters in the X and Y coordinates, and 41 meters in the Z coordinate, may be supported. The second communication and/or the information element may include as many instances of antenna locations as there are antennas deployed on the vehicle. For example, if there are B antennas associated with the vehicle, the second communication and/or the information element may identify B locations, each of the locations corresponding to one of the antennas.

As indicated above, FIG. 8 is provided as an example. Other examples may differ from what is described with respect to FIG. 8.

Figure 9:
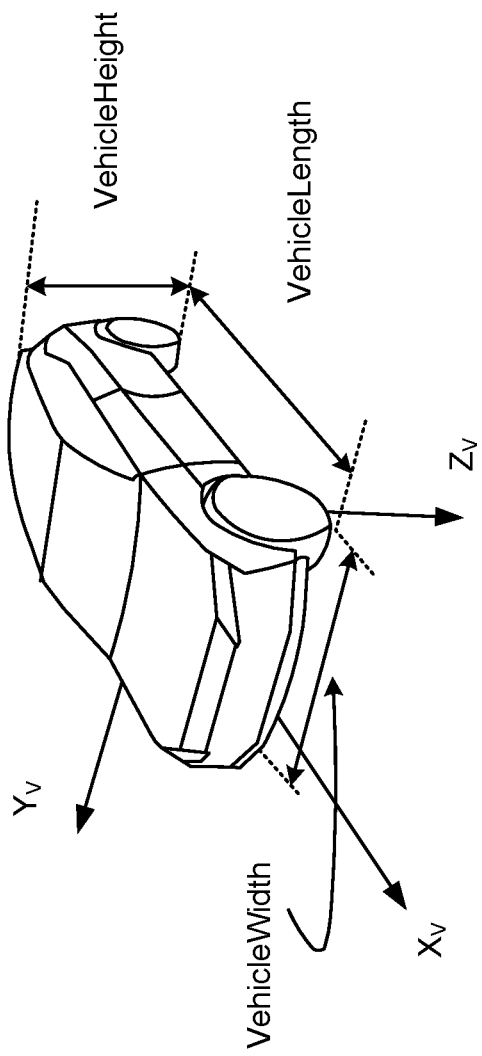
FIG. 9 is a diagram illustrating an example of an information element associated with a vehicle size, in accordance with the present disclosure.

FIG. 9 is a diagram illustrating an example 900 of an information element associated with a vehicle size, in accordance with the present disclosure. In some aspects, the information element may indicate a size of the vehicle. The size of the vehicle may be indicated by one or more dimensions of the vehicle. For example, the one or more dimensions of the vehicle may include a length of the vehicle, a width of the vehicle, or a height of the vehicle. The vehicle size may enable boundary-to-boundary (e.g., perimeter-to-perimeter, or bumper-to-bumper) distance determination. The vehicle dimensions (e.g., combined with the vehicle reference position and/or the antenna relative position) may enable participants in a sidelink ranging session (e.g., the transmitter UE 505 or the receiver UE 510) to determine a boundary-to-boundary distance from a sidelink ranging or position measurement. The vehicle length, vehicle width, and vehicle height may be measured along the vehicle inherent body axes (Xv, Yv, Zv). In some aspects, the vehicle height and width may be between 0 to 10 meters, and the vehicle length may be between 0 to 40 meters.

As indicated above, FIG. 9 is provided as an example. Other examples may differ from what is described with respect to FIG. 9.

Figure 10A:
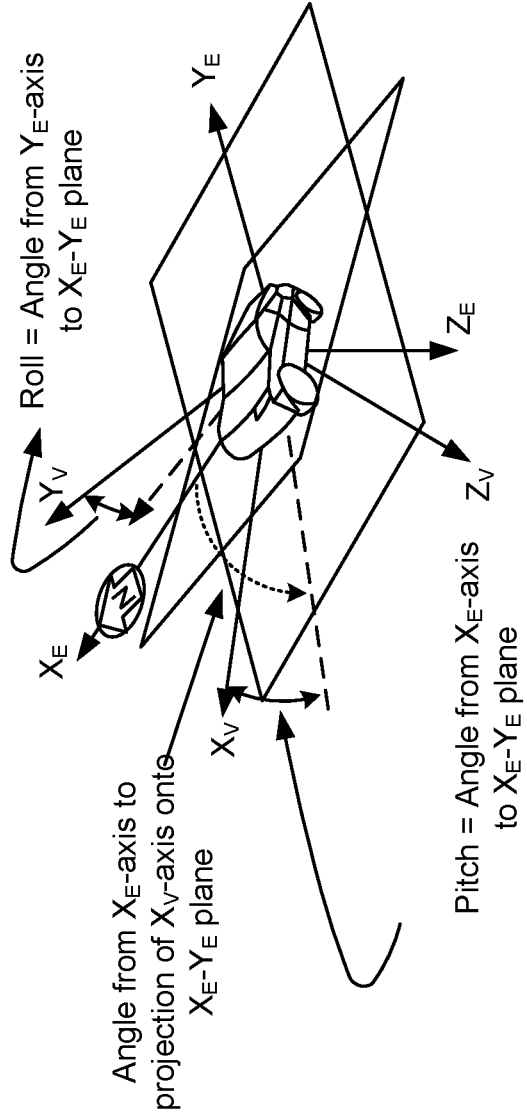
FIGS. 10A and 10B are diagrams illustrating an example of an information element associated with an attitude of a vehicle, in accordance with the present disclosure.
Figure 10B:
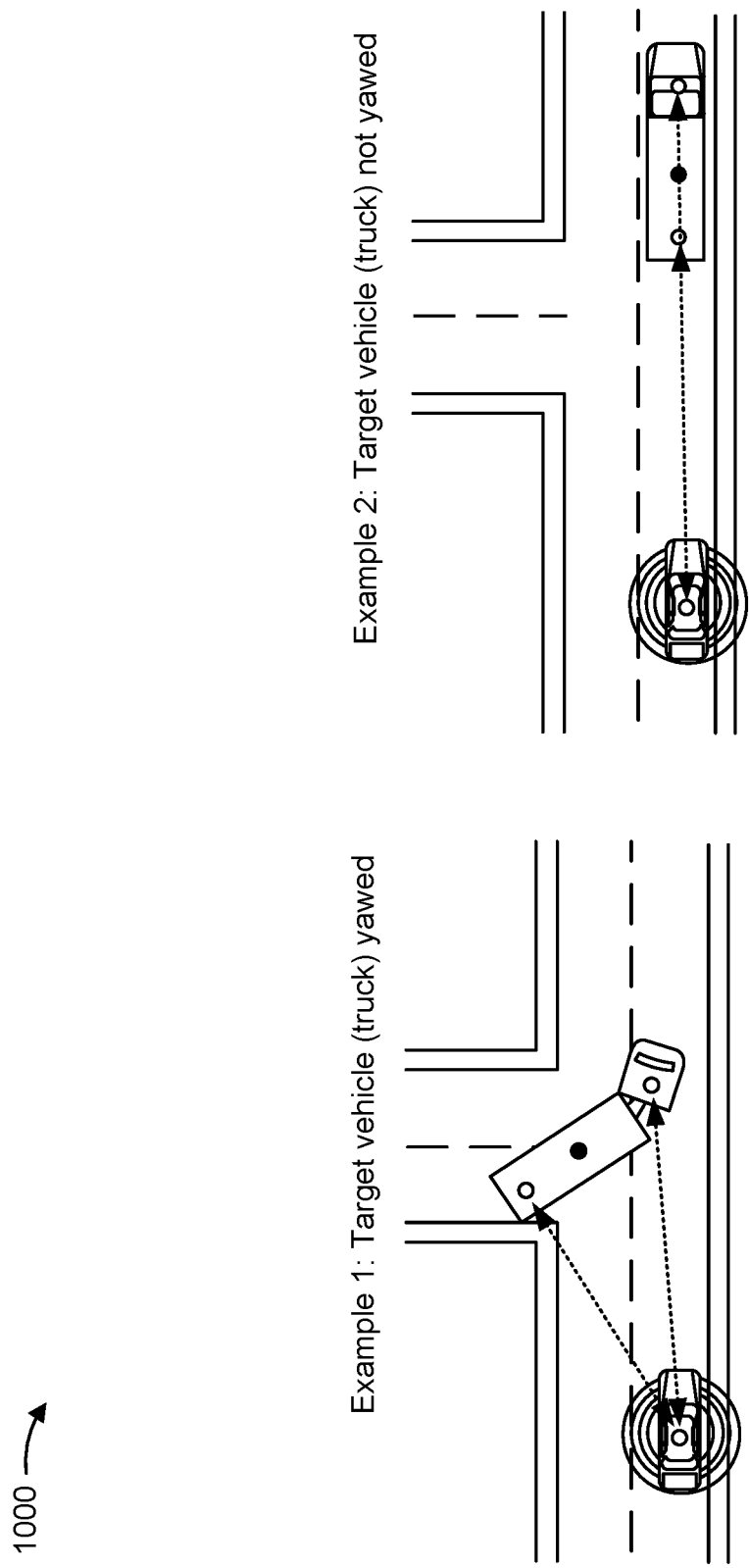

FIGS. 10A and 10B are diagrams illustrating an example 1000 of an information element associated with an attitude of a vehicle, in accordance with the present disclosure. In some aspects, the information element may indicate an attitude of the vehicle. The attitude of the vehicle may indicate one or more of a yaw of the vehicle, a pitch of the vehicle, or a roll of the vehicle (e.g., as shown in FIG. 10A). The vehicle attitude may enable participants in a sidelink ranging session (e.g., the transmitter UE 505 or the receiver UE 510) to determine a boundary-to-boundary distance from a sidelink ranging or position measurement (e.g., as shown in FIG. 10B). In some aspects, the vehicle attitude may be measured from the vehicle body axes (Xv, Yv, Zv) with respect to earth-fixed axes (Xe, Ye, Ze). Although the attitude of the vehicle is described herein as including a yaw of the vehicle, a pitch of the vehicle, and/or a roll of the vehicle, the attitude of the vehicle may additionally or alternatively include other parameters.

As indicated above, FIGS. 10A and 10B are provided as examples. Other examples may differ from what is described with respect to FIGS. 10A and 10B.

FIG. 11 is a diagram illustrating an example 1100 of an information element associated with a type of a vehicle, in accordance with the present disclosure. In some aspects, the information element may indicate a type of the vehicle. The type of the vehicle may indicate other information, such as a class of the vehicle, or a model of the vehicle, among other examples. Alternatively, the other information, such as the class of the vehicle or the model of the vehicle, may be indicated separately from the type of the vehicle. In the example shown in FIG. 11, the vehicle type may be a passenger vehicle or a light truck vehicle. The passenger vehicle type may indicate the manufacturer of the vehicle, the year of the vehicle, and/or the model of the vehicle, among other examples. Similarly, the light truck vehicle type may indicate the manufacturer of the vehicle, the year of the vehicle, and/or the model of the vehicle, among other examples.

In some aspects, the vehicle type, vehicle class, or vehicle model may enable expedited determination of the vehicle size and/or vehicle boundaries. For example, vehicles may be configured with information for certain vehicle types, vehicle classes, and/or vehicle models. The information may be based at least in part on information from standards developing organizations (e.g., SAE, ISO) and/or federal agencies. Configuring the UE (e.g., the transmitter UE 505 or the receiver UE 510) with information associated with the vehicle type, vehicle class, and/or vehicle model may enable the UE to determine a boundary of a vehicle more efficiently. For example, rather than determining (e.g., calculating) the boundary of another vehicle using the PRS signal, the reference position, and the antenna location of the vehicle, the UE may receive an information element that indicates the vehicle type, vehicle class, or vehicle model, and may determine the size of the vehicle and/or the boundary of the vehicle by accessing the information (e.g., information stored by the UE) associated with that vehicle type, class, or model.

As indicated above, FIG. 11 is provided as an example. Other examples may differ from what is described with respect to FIG. 11.

Figure 12:
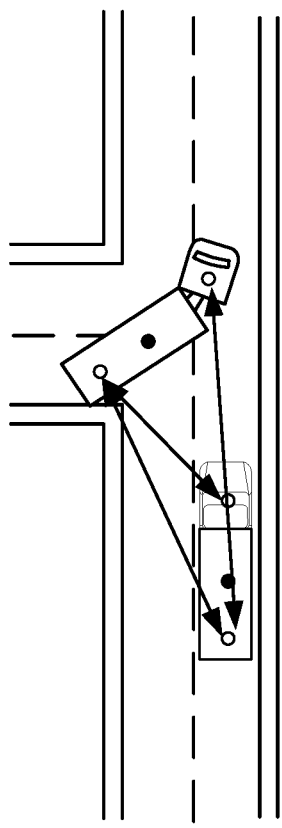
FIG. 12 is a diagram illustrating an example of a UE communicating with a roadside unit, in accordance with the present disclosure.
Figure 12:
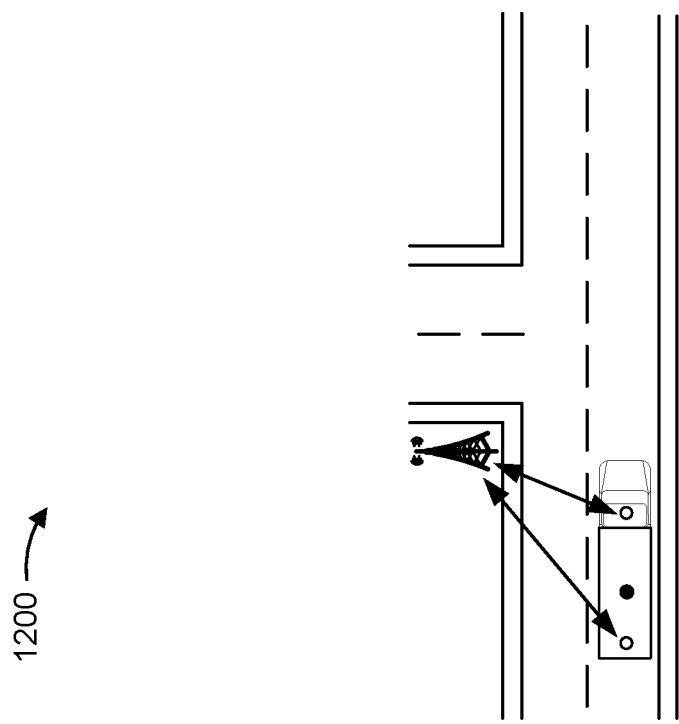

FIG. 12 is a diagram illustrating an example 1200 of a UE communicating with a roadside unit (RSU), in accordance with the present disclosure. In some aspects, the transmitter UE 505 may perform sidelink positioning to determine the location of the transmitter UE 505. In this case, the receiver UE 510 may be an RSU, and the transmitter UE 505 may determine not transmit certain information elements, such as the location of the antenna, the size of the vehicle, the attitude of the vehicle, or the type of the vehicle. Since the transmitter UE 505 may be aware of certain information associated with the transmitter UE 505, the transmitter UE 505 can reduce network bandwidth by omitting those information elements in the communications. Instead, the transmitter UE 505 may receive a reference position from the receiver UE 510, and can apply the reference position information against the stored information for the transmitter UE 505. Thus, the transmitter UE 505 may determine whether or not a vehicle associated with the transmitter UE 505 should make one or more movements based at least in part on the received reference position (e.g., from the receiver UE 510) and the stored information for the transmitter UE 505 (e.g., the location of the antenna, the size of the vehicle, the attitude of the vehicle, or the type of the vehicle).

As shown in Example 1 of FIG. 12, the vehicle may not need to transmit the certain information elements when communicating with an RSU. For example, the antenna location, size of vehicle, attitude of vehicle, or type of vehicle may not be included in the second communication, and the vehicle can determine to make one or more maneuvers based at least in part on position information received from RSU. In contrast, as shown in Example 2 of FIG. 12, the vehicle may transmit the certain information elements when communicating with another vehicle, such that the other vehicle can determine the boundary information associated with the vehicle. For example, the location, size of vehicle, attitude of vehicle, and/or type of vehicle may be included in second the communication, and the vehicle maneuver determination may require knowledge of the perimeter-to-perimeter inter-vehicle distance. In some aspects, one or more of the information elements may be implicitly included in a post-PRS message of the initiating UE (e.g., the transmitter UE 505). In some aspects, one or more of the information elements may be explicitly included in a pre-PRS message of the initiating UE (e.g., the transmitter UE 505).

As indicated above, FIG. 12 is provided as an example. Other examples may differ from what is described with respect to FIG. 12.

Figure 13:
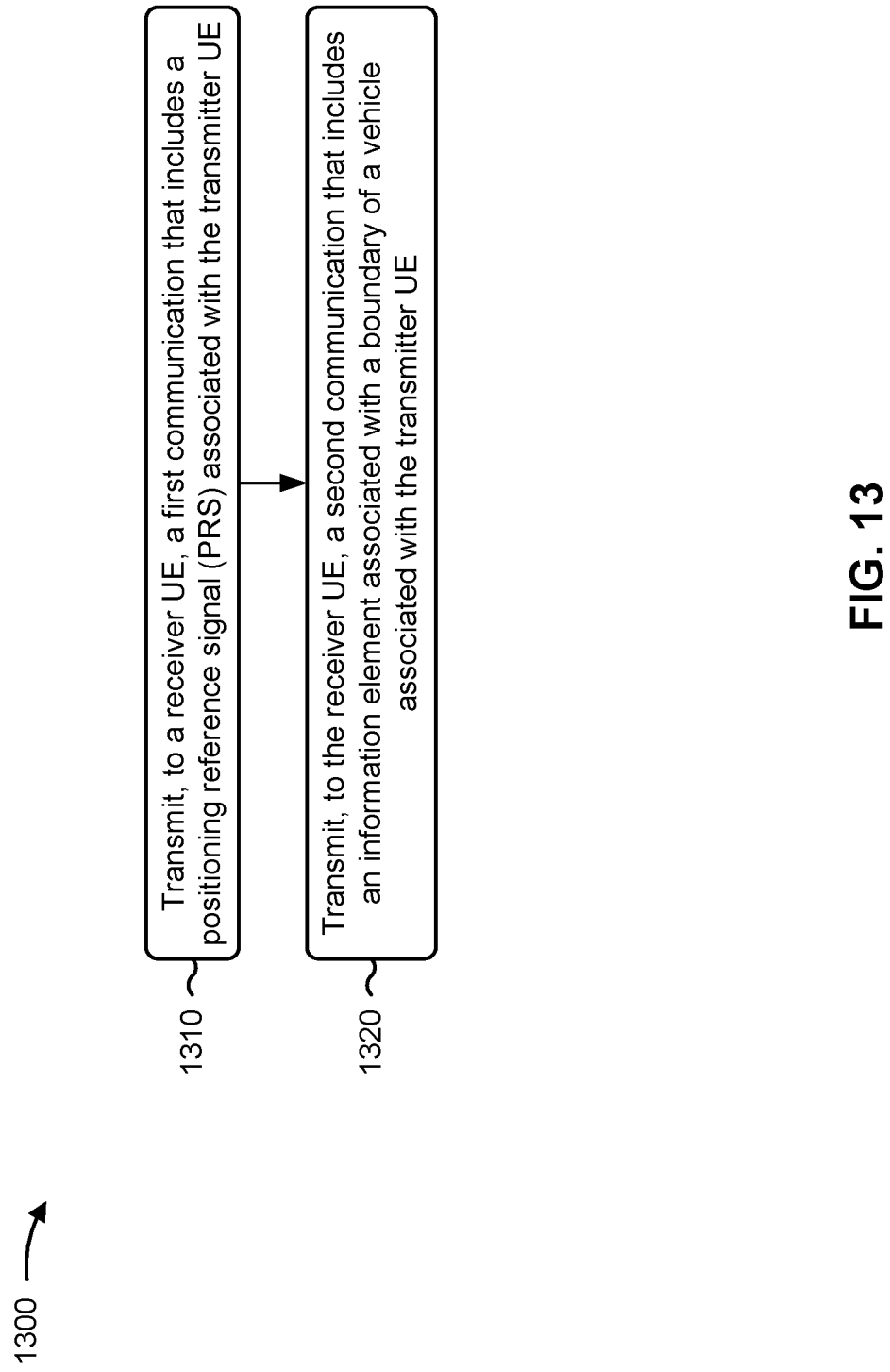
FIG. 13 is a diagram illustrating an example process associated with UE based positioning, in accordance with the present disclosure.

FIG. 13 is a diagram illustrating an example process 1300 performed, for example, by a transmitter UE, in accordance with the present disclosure. Example process 1300 is an example where the UE (e.g., UE 120) performs operations associated with UE based positioning.

As shown in FIG. 13, in some aspects, process 1300 may include transmitting, to a receiver UE, a first communication that includes a PRS associated with the transmitter UE (block 1310). For example, the UE (e.g., using communication manager 140 and/or transmission component 1504, depicted in FIG. 15) may transmit, to a receiver UE, a first communication that includes a PRS associated with the transmitter UE, as described above.

As further shown in FIG. 13, in some aspects, process 1300 may include transmitting, to the receiver UE, a second communication that includes an information element associated with a boundary of a vehicle associated with the transmitter UE (block 1320). For example, the UE (e.g., using communication manager 140 and/or transmission component 1504, depicted in FIG. 15) may transmit, to the receiver UE, a second communication that includes an information element associated with a boundary of a vehicle associated with the transmitter UE, as described above.

Process 1300 may include additional aspects, such as any single aspect or any combination of aspects described below and/or in connection with one or more other processes described elsewhere herein.

In a first aspect, the information element indicates a reference position of the vehicle, a location of an antenna of the transmitter UE, a size of the vehicle, an attitude of the vehicle, or a type of the vehicle.

In a second aspect, alone or in combination with the first aspect, the reference position of the vehicle is indicated by one or more coordinates.

In a third aspect, alone or in combination with one or more of the first and second aspects, the one or more coordinates are identified relative to the boundary of the vehicle.

In a fourth aspect, alone or in combination with one or more of the first through third aspects, the location of the antenna of the transmitter UE is indicated relative to the reference position of the vehicle.

In a fifth aspect, alone or in combination with one or more of the first through fourth aspects, the transmitter UE includes a plurality of antennas, and respective locations of each of the plurality of the antennas are indicated relative to the reference position of the vehicle.

In a sixth aspect, alone or in combination with one or more of the first through fifth aspects, the size of the vehicle is indicated as one or more dimensions of the vehicle.

In a seventh aspect, alone or in combination with one or more of the first through sixth aspects, the one or more dimensions of the vehicle include a length of the vehicle, a width of the vehicle, or a height of the vehicle.

In an eighth aspect, alone or in combination with one or more of the first through seventh aspects, the attitude of the vehicle is indicated as one or more of a yaw of the vehicle, a pitch of the vehicle, or a roll of the vehicle.

In a ninth aspect, alone or in combination with one or more of the first through eighth aspects, the type of the vehicle includes a class of the vehicle.

In a tenth aspect, alone or in combination with one or more of the first through ninth aspects, the receiver UE is a roadside unit, and the information element indicates a reference position of the vehicle.

In an eleventh aspect, alone or in combination with one or more of the first through tenth aspects, the second communication that includes the information element is an application layer message.

In a twelfth aspect, alone or in combination with one or more of the first through eleventh aspects, the second communication that includes the information element is a PC5 radio resource control message.

In a thirteenth aspect, alone or in combination with one or more of the first through twelfth aspects, the first communication and the second communication are sidelink communications.

In a fourteenth aspect, alone or in combination with one or more of the first through thirteenth aspects, the first communication and the second communication are radio link communications.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
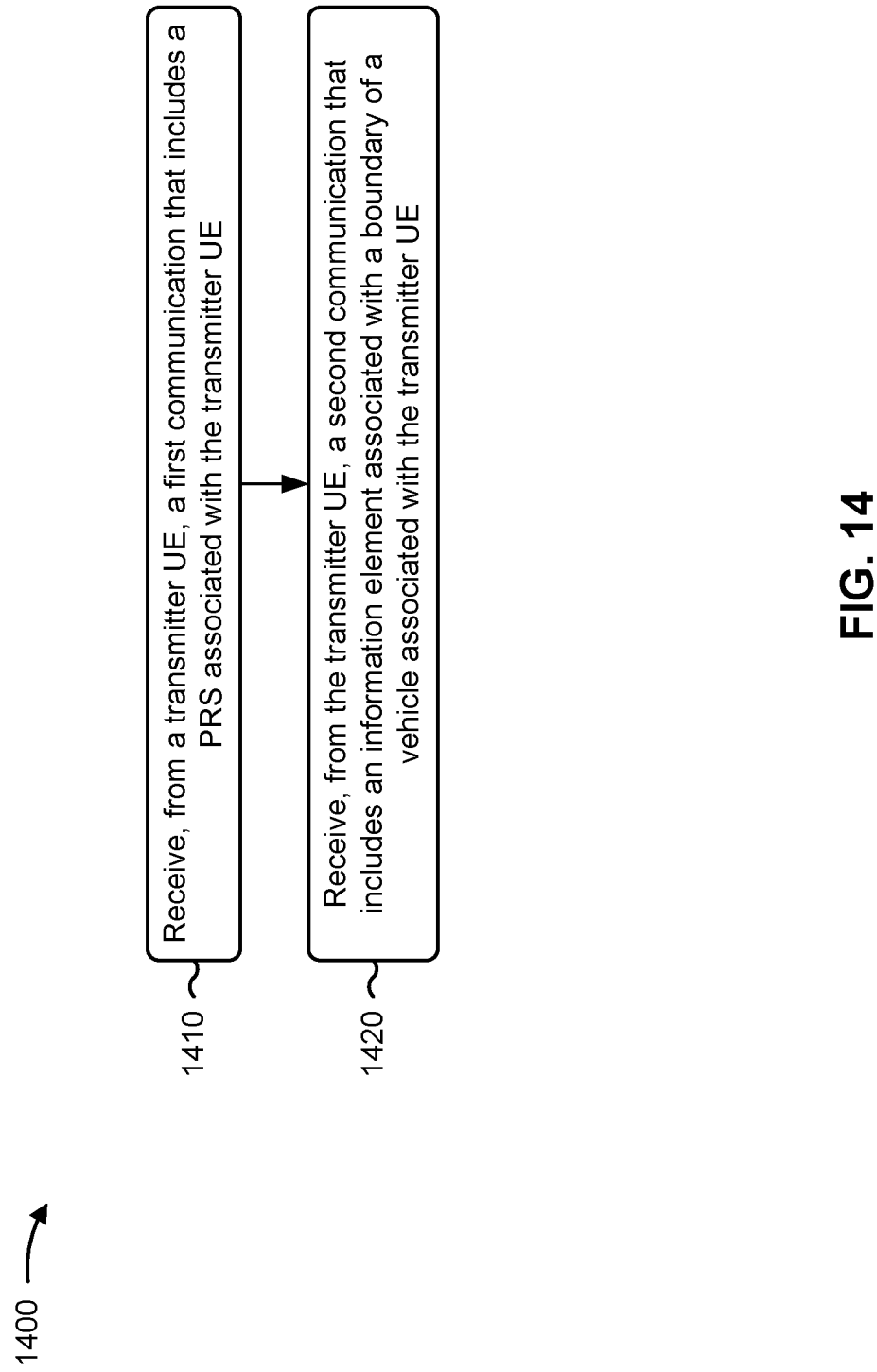
FIG. 14 is a diagram illustrating an example process associated with UE based positioning, in accordance with the present disclosure.

FIG. 14 is a diagram illustrating an example process 1400 performed, for example, by a receiver UE, in accordance with the present disclosure. Example process 1400 is an example where the UE (e.g., UE 120) performs operations associated with UE based positioning.

As shown in FIG. 14, in some aspects, process 1400 may include receiving, from a transmitter UE, a first communication that includes a PRS associated with the transmitter UE (block 1410). For example, the UE (e.g., using communication manager 140 and/or reception component 1602, depicted in FIG. 16) may receive, from a transmitter UE, a first communication that includes a PRS associated with the transmitter UE, as described above.

As further shown in FIG. 14, in some aspects, process 1400 may include receiving, from the transmitter UE, a second communication that includes an information element associated with a boundary of a vehicle associated with the transmitter UE (block 1420). For example, the UE (e.g., using communication manager 140 and/or reception component 1602, depicted in FIG. 16) may receive, from the transmitter UE, a second communication that includes an information element associated with a boundary of a vehicle associated with the transmitter UE, as described above.

Process 1400 may include additional aspects, such as any single aspect or any combination of aspects described below and/or in connection with one or more other processes described elsewhere herein.

In a first aspect, the information element indicates a reference position of the vehicle, a location of an antenna of the transmitter UE, a size of the vehicle, an attitude of the vehicle, or a type of the vehicle.

In a second aspect, alone or in combination with the first aspect, the reference position of the vehicle is indicated by one or more coordinates.

In a third aspect, alone or in combination with one or more of the first and second aspects, the one or more coordinates are identified relative to the boundary of the vehicle.

In a fourth aspect, alone or in combination with one or more of the first through third aspects, the location of the antenna of the transmitter UE is indicated relative to the reference position of the transmitter UE.

In a fifth aspect, alone or in combination with one or more of the first through fourth aspects, the transmitter UE includes a plurality of antennas, and respective locations of each of the plurality of the antennas are indicated relative to the reference position of the vehicle.

In a sixth aspect, alone or in combination with one or more of the first through fifth aspects, the size of the vehicle is indicated as one or more dimensions of the vehicle.

In a seventh aspect, alone or in combination with one or more of the first through sixth aspects, the one or more dimensions of the vehicle include a length of the vehicle, a width of the vehicle, or a height of the vehicle.

In an eighth aspect, alone or in combination with one or more of the first through seventh aspects, the attitude of the vehicle is indicated as one or more of a yaw of the vehicle, a pitch of the vehicle, or a roll of the vehicle.

In a ninth aspect, alone or in combination with one or more of the first through eighth aspects, the type of the vehicle includes a class of the vehicle.

In a tenth aspect, alone or in combination with one or more of the first through ninth aspects, the second communication that includes the information element is an application layer message.

In an eleventh aspect, alone or in combination with one or more of the first through tenth aspects, the second communication that includes the information element is a PC5 radio resource control message.

In a twelfth aspect, alone or in combination with one or more of the first through eleventh aspects, the first communication and the second communication are sidelink communications.

In a thirteenth aspect, alone or in combination with one or more of the first through twelfth aspects, the first communication and the second communication are radio link communications.

In a fourteenth aspect, alone or in combination with one or more of the first through thirteenth aspects, process 1400 includes determining the boundary of the vehicle based at least in part on the information element.

In a fifteenth aspect, alone or in combination with one or more of the first through fourteenth aspects, process 1400 includes selectively transmitting an indication for the vehicle associated with the transmitter UE to perform one or more movements based at least in part on the boundary of the vehicle.

In a sixteenth aspect, alone or in combination with one or more of the first through fifteenth aspects, process 1400 includes selectively transmitting an indication for a second vehicle associated with the receiver UE to perform one or more movements based at least in part on the boundary of the vehicle.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
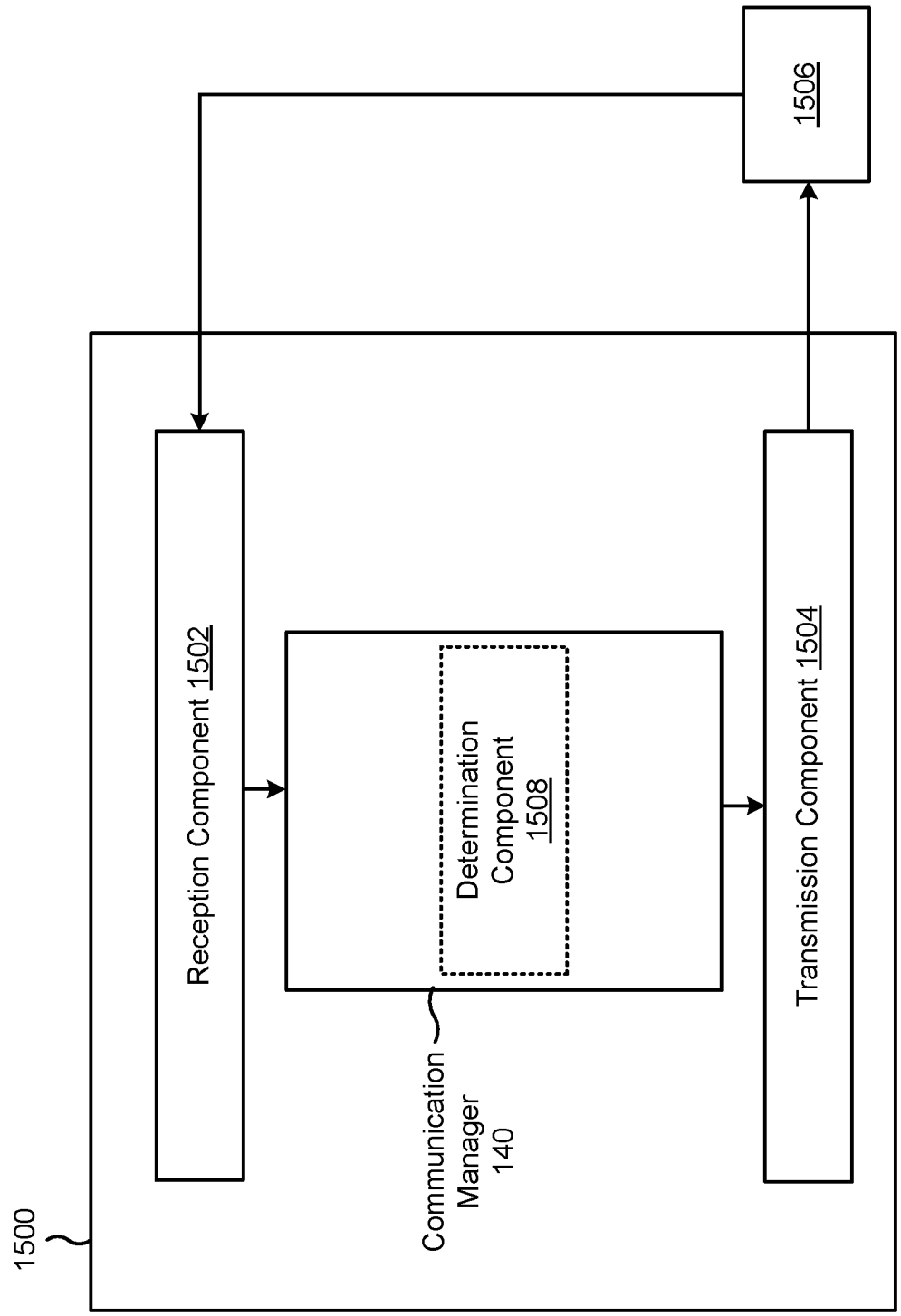
FIG. 15 is a diagram of an example apparatus for wireless communication, in accordance with the present disclosure.

FIG. 15 is a diagram of an example apparatus 1500 for wireless communication. The apparatus 1500 may be a transmitter UE, or a transmitter UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a determination component 1508, among other examples.

In some aspects, the apparatus 1500 may be configured to perform one or more operations described herein in connection with FIGS. 6-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the transmitter UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the transmitter UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the transmitter UE described in connection with FIG. 2. In some aspects, the transmission component 1504 may be co-located with the reception component 1502 in a transceiver.

The transmission component 1504 may transmit, to a receiver UE, a first communication that includes a PRS associated with the transmitter UE. The transmission component 1504 may transmit, to the receiver UE, a second communication that includes an information element associated with a boundary of a vehicle associated with the transmitter UE.

The determination component 1508 may determine the boundary of the vehicle based at least in part on the information element.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
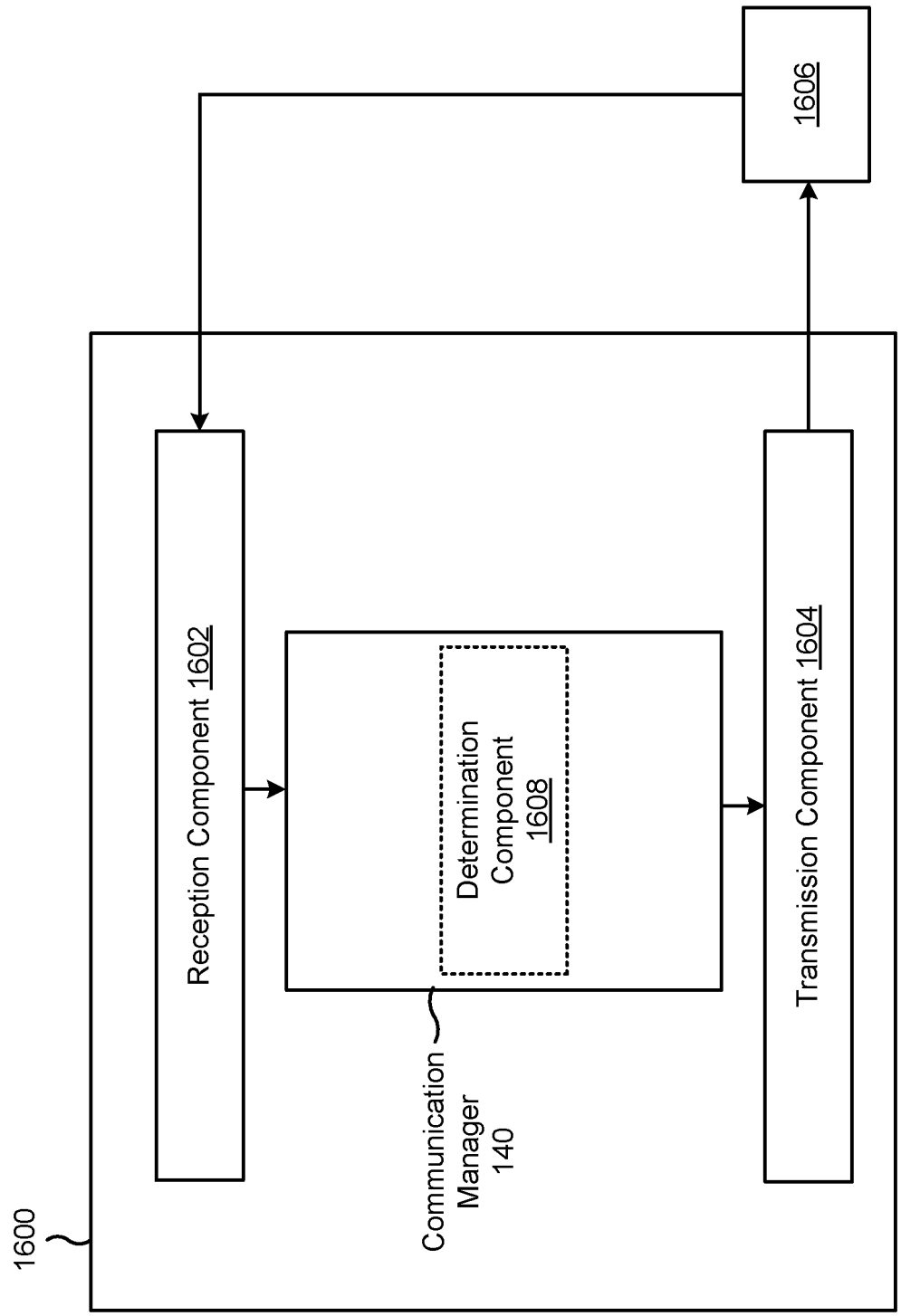
FIG. 16 is a diagram of an example apparatus for wireless communication, in accordance with the present disclosure.

FIG. 16 is a diagram of an example apparatus 1600 for wireless communication. The apparatus 1600 may be a receiver UE, or a receiver UE may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 140. The communication manager 140 may include one or more of a determination component 1608, among other examples.

In some aspects, the apparatus 1600 may be configured to perform one or more operations described herein in connection with FIGS. 6-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the receiver UE described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the receiver UE described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the receiver UE described in connection with FIG. 2. In some aspects, the transmission component 1604 may be co-located with the reception component 1602 in a transceiver.

The reception component 1602 may receive, from a transmitter UE, a first communication that includes a PRS associated with the transmitter UE. The reception component 1602 may receive, from the transmitter UE, a second communication that includes an information element associated with a boundary of a vehicle associated with the transmitter UE.

The determination component 1608 may determine the boundary of the vehicle based at least in part on the information element.

The transmission component 1604 may selectively transmit an indication for the vehicle associated with the transmitter UE to perform one or more movements based at least in part on the boundary of the vehicle.

The transmission component 1604 may selectively transmit an indication for a second vehicle associated with the receiver UE to perform one or more movements based at least in part on the boundary of the vehicle.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a transmitter user equipment (UE), comprising: transmitting, to a receiver UE, a first communication that includes a positioning reference signal (PRS) associated with the transmitter UE; and transmitting, to the receiver UE, a second communication that includes an information element associated with a boundary of a vehicle associated with the transmitter UE.

Aspect 2: The method of Aspect 1, wherein the information element indicates a reference position of the vehicle, a location of an antenna of the transmitter UE, a size of the vehicle, an attitude of the vehicle, or a type of the vehicle.

Aspect 3: The method of Aspect 2, wherein the reference position of the vehicle is indicated by one or more coordinates.

Aspect 4: The method of Aspect 3, wherein the one or more coordinates are identified relative to the boundary of the vehicle.

Aspect 5: The method of any of Aspects 2-4, wherein the location of the antenna of the transmitter UE is indicated relative to the reference position of the vehicle.

Aspect 6: The method of Aspect 5, wherein the transmitter UE includes a plurality of antennas, and respective locations of each of the plurality of the antennas are indicated relative to the reference position of the vehicle.

Aspect 7: The method of any of Aspects 2-6, wherein the size of the vehicle is indicated as one or more dimensions of the vehicle.

Aspect 8: The method of Aspect 7, wherein the one or more dimensions of the vehicle include a length of the vehicle, a width of the vehicle, or a height of the vehicle.

Aspect 9: The method of any of Aspects 2-8, wherein the attitude of the vehicle is indicated as one or more of a yaw of the vehicle, a pitch of the vehicle, or a roll of the vehicle.

Aspect 10: The method of any of Aspects 2-9, wherein the type of the vehicle includes a class of the vehicle.

Aspect 11: The method of any of Aspects 1-10, wherein the receiver UE is a roadside unit, and wherein the information element indicates a reference position of the vehicle.

Aspect 12: The method of any of Aspects 1-11, wherein the second communication that includes the information element is an application layer message.

Aspect 13: The method of any of Aspects 1-12, wherein the second communication that includes the information element is a PC5 radio resource control message.

Aspect 14: The method of any of Aspects 1-13, wherein the first communication and the second communication are sidelink communications.

Aspect 15: The method of any of Aspects 1-14, wherein the first communication and the second communication are radio link communications.

Aspect 16: A method of wireless communication performed by a receiver user equipment (UE), comprising: receiving, from a transmitter UE, a first communication that includes a positioning reference signal (PRS) associated with the transmitter UE; and receiving, from the transmitter UE, a second communication that includes an information element associated with a boundary of a vehicle associated with the transmitter UE.

Aspect 17: The method of Aspect 16, wherein the information element indicates a reference position of the vehicle, a location of an antenna of the transmitter UE, a size of the vehicle, an attitude of the vehicle, or a type of the vehicle.

Aspect 18: The method of Aspect 17, wherein the reference position of the vehicle is indicated by one or more coordinates.

Aspect 19: The method of Aspect 18, wherein the one or more coordinates are identified relative to the boundary of the vehicle.

Aspect 20: The method of any of Aspects 17-19, wherein the location of the antenna of the transmitter UE is indicated relative to the reference position of the transmitter UE.

Aspect 21: The method of Aspect 20, wherein the transmitter UE includes a plurality of antennas, and respective locations of each of the plurality of the antennas are indicated relative to the reference position of the vehicle.

Aspect 22: The method of any of Aspects 17-21, wherein the size of the vehicle is indicated as one or more dimensions of the vehicle.

Aspect 23: The method of Aspect 22, wherein the one or more dimensions of the vehicle include a length of the vehicle, a width of the vehicle, or a height of the vehicle.

Aspect 24: The method of any of Aspects 17-23, wherein the attitude of the vehicle is indicated as one or more of a yaw of the vehicle, a pitch of the vehicle, or a roll of the vehicle.

Aspect 25: The method of any of Aspects 17-24, wherein the type of the vehicle includes a class of the vehicle.

Aspect 26: The method of any of Aspects 16-25, wherein the second communication that includes the information element is an application layer message.

Aspect 27: The method of any of Aspects 16-26, wherein the second communication that includes the information element is a PC5 radio resource control message.

Aspect 28: The method of any of Aspects 16-27, wherein the first communication and the second communication are sidelink communications.

Aspect 29: The method of any of Aspects 16-28, wherein the first communication and the second communication are radio link communications.

Aspect 30: The method of any of Aspects 16-29, further comprising determining the boundary of the vehicle based at least in part on the information element.

Aspect 31: The method of Aspect 30, further comprising selectively transmitting an indication for the vehicle associated with the transmitter UE to perform one or more movements based at least in part on the boundary of the vehicle.

Aspect 32: The method of Aspect 30, further comprising selectively transmitting an indication for a second vehicle associated with the receiver UE to perform one or more movements based at least in part on the boundary of the vehicle.

Aspect 33: An apparatus for wireless communication at a device, comprising a processor; memory coupled with the processor; and instructions stored in the memory and executable by the processor to cause the apparatus to perform the method of one or more of Aspects 1-15.

Aspect 34: A device for wireless communication, comprising a memory and one or more processors coupled to the memory, the one or more processors configured to perform the method of one or more of Aspects 1-15.

Aspect 35: An apparatus for wireless communication, comprising at least one means for performing the method of one or more of Aspects 1-15.

Aspect 36: A non-transitory computer-readable medium storing code for wireless communication, the code comprising instructions executable by a processor to perform the method of one or more of Aspects 1-15.

Aspect 37: A non-transitory computer-readable medium storing a set of instructions for wireless communication, the set of instructions comprising one or more instructions that, when executed by one or more processors of a device, cause the device to perform the method of one or more of Aspects 1-15.

Aspect 38: An apparatus for wireless communication at a device, comprising a processor; memory coupled with the processor; and instructions stored in the memory and executable by the processor to cause the apparatus to perform the method of one or more of Aspects 16-32.

Aspect 39: A device for wireless communication, comprising a memory and one or more processors coupled to the memory, the one or more processors configured to perform the method of one or more of Aspects 16-32.

Aspect 40: An apparatus for wireless communication, comprising at least one means for performing the method of one or more of Aspects 16-32.

Aspect 41: A non-transitory computer-readable medium storing code for wireless communication, the code comprising instructions executable by a processor to perform the method of one or more of Aspects 16-32.

Aspect 42: A non-transitory computer-readable medium storing a set of instructions for wireless communication, the set of instructions comprising one or more instructions that, when executed by one or more processors of a device, cause the device to perform the method of one or more of Aspects 16-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a transmitter user equipment (UE), comprising:
   a memory; and
   one or more processors, coupled to the memory, configured to:
   transmit, to a receiver UE, a first communication that includes a positioning reference signal (PRS) associated with the transmitter UE; and
   transmit, to the receiver UE, a second communication that includes an information element associated with a boundary of a vehicle associated with the transmitter UE.

2. The apparatus of claim 1, wherein the information element indicates a reference position of the vehicle, a location of an antenna of the transmitter UE, a size of the vehicle, an attitude of the vehicle, or a type of the vehicle.

3. The apparatus of claim 2, wherein the reference position of the vehicle is indicated by one or more coordinates.

4. The apparatus of claim 2, wherein the location of the antenna of the transmitter UE is indicated relative to the reference position of the vehicle.

5. The apparatus of claim 2, wherein the size of the vehicle is indicated as one or more dimensions of the vehicle.

6. The apparatus of claim 2, wherein the attitude of the vehicle is indicated as one or more of a yaw of the vehicle, a pitch of the vehicle, or a roll of the vehicle.

7. The apparatus of claim 2, wherein the type of the vehicle includes a class of the vehicle.

8. The apparatus of claim 1, wherein the receiver UE is a roadside unit, and wherein the information element indicates a reference position of the vehicle.

9. The apparatus of claim 1, wherein the first communication and the second communication are sidelink communications.

10. The apparatus of claim 1, wherein the first communication and the second communication are radio link communications.

11. An apparatus for wireless communication at a receiver user equipment (UE), comprising:
    a memory; and
    one or more processors, coupled to the memory, configured to:
    receive, from a transmitter UE, a first communication that includes a positioning reference signal (PRS) associated with the transmitter UE; and
    receive, from the transmitter UE, a second communication that includes an information element associated with a boundary of a vehicle associated with the transmitter UE.

12. The apparatus of claim 11, wherein the information element indicates a reference position of the vehicle, a location of an antenna of the transmitter UE, a size of the vehicle, an attitude of the vehicle, or a type of the vehicle.

13. The apparatus of claim 12, wherein the reference position of the vehicle is indicated by one or more coordinates.

14. The apparatus of claim 12, wherein the location of the antenna of the transmitter UE is indicated relative to the reference position of the transmitter UE.

15. The apparatus of claim 12, wherein the size of the vehicle is indicated as one or more dimensions of the vehicle.

16. The apparatus of claim 12, wherein the attitude of the vehicle is indicated as one or more of a yaw of the vehicle, a pitch of the vehicle, or a roll of the vehicle.

17. The apparatus of claim 12, wherein the type of the vehicle includes a class of the vehicle.

18. The apparatus of claim 11, wherein the first communication and the second communication are sidelink communications.

19. The apparatus of claim 11, wherein the first communication and the second communication are radio link communications.

20. The apparatus of claim 11, wherein the one or more processors are further configured to determine the boundary of the vehicle based at least in part on the information element.

21. A method of wireless communication performed by a transmitter user equipment (UE), comprising:
    transmitting, to a receiver UE, a first communication that includes a positioning reference signal (PRS) associated with the transmitter UE; and
    transmitting, to the receiver UE, a second communication that includes an information element associated with a boundary of a vehicle associated with the transmitter UE.

22. The method of claim 21, wherein the information element indicates a reference position of the vehicle, a location of an antenna of the transmitter UE, a size of the vehicle, an attitude of the vehicle, or a type of the vehicle.

23. The method of claim 22, wherein the reference position of the vehicle is indicated by one or more coordinates.

24. The method of claim 22, wherein the location of the antenna of the transmitter UE is indicated relative to the reference position of the vehicle.

25. The method of claim 22, wherein the size of the vehicle is indicated as one or more dimensions of the vehicle.

26. A method of wireless communication performed by a receiver user equipment (UE), comprising:
- receiving, from a transmitter UE, a first communication that includes a positioning reference signal (PRS) associated with the transmitter UE; and
- receiving, from the transmitter UE, a second communication that includes an information element associated with a boundary of a vehicle associated with the transmitter UE.

27. The method of claim 26, wherein the information element indicates a reference position of the vehicle, a location of an antenna of the transmitter UE, a size of the vehicle, an attitude of the vehicle, or a type of the vehicle.

28. The method of claim 27, wherein the reference position of the vehicle is indicated by one or more coordinates.

29. The method of claim 27, wherein the location of the antenna of the transmitter UE is indicated relative to the reference position of the transmitter UE.

30. The method of claim 27, wherein the size of the vehicle is indicated as one or more dimensions of the vehicle.

* * * * *